United States Patent
Bembridge et al.

(10) Patent No.: US 9,353,921 B2
(45) Date of Patent: May 31, 2016

(54) LUMINAIRE COMBINING AMBIENT LIGHT AND TASK LIGHT

(75) Inventors: Mathew Lee Bembridge, Rotterdam (NL); George Francis Watson, Twickenham (GB); Oscar Enrique Pena, London (GB); Stefano Luigi Marzano, Bergeijk (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 602 days.

(21) Appl. No.: 13/259,181

(22) PCT Filed: Mar. 18, 2010

(86) PCT No.: PCT/IB2010/051167
§ 371 (c)(1),
(2), (4) Date: Sep. 23, 2011

(87) PCT Pub. No.: WO2010/109378
PCT Pub. Date: Sep. 30, 2010

(65) Prior Publication Data
US 2012/0091903 A1    Apr. 19, 2012

(30) Foreign Application Priority Data
Mar. 25, 2009    (EP) ..................................... 09156171

(51) Int. Cl.
*H05B 37/02*    (2006.01)
*F21S 6/00*    (2006.01)
*F21S 8/00*    (2006.01)
*F21V 23/04*    (2006.01)
*F21Y 101/02*    (2006.01)
*F21Y 113/00*    (2016.01)
(Continued)

(52) U.S. Cl.
CPC ................. *F21S 6/005* (2013.01); *F21S 8/036* (2013.01); *F21V 23/0492* (2013.01); *F21V 21/30* (2013.01); *F21W 2121/00* (2013.01); *F21Y 2101/02* (2013.01); *F21Y 2105/008* (2013.01); *F21Y 2113/00* (2013.01); *F21Y 2113/02* (2013.01); *Y02B 20/36* (2013.01)

(58) Field of Classification Search
CPC .............. H05B 37/02; H05B 37/0227; H05B 33/0803; H05B 37/00; H05B 37/0245; H05B 33/0863; H05B 33/0896; F21Y 2101/02; F21Y 2103/003; F21Y 2105/001; F21Y 2113/00; F21Y 2113/02; F21Y 2103/00; F21Y 2105/008; Y02B 20/36; F21S 6/005; F21S 8/036
USPC ............................... 315/291, 209 R, 178, 297
See application file for complete search history.

(56) References Cited

U.S. PATENT DOCUMENTS 6,255,747 B1 *    7/2001    Ramirez et al. ................ 307/119
7,742,014 B2 *    6/2010    Kimura ........................... 345/48
(Continued)

FOREIGN PATENT DOCUMENTS

CN    2551864 Y    5/2003
CN    201162969 Y    12/2008
(Continued)

*Primary Examiner* — Haissa Philogene
*Assistant Examiner* — Amy Yang
(74) *Attorney, Agent, or Firm* — Meenakshy Chakravorty

(57) ABSTRACT

A luminaire is disclosed that allows a transfer from ambient light to task light through physical manipulation by the user. The luminaire comprises OLED light sources for generating an ambient light effect and LED light sources for generating a task light effect.

12 Claims, 2 Drawing Sheets

(51) Int. Cl.
*F21V 21/30* (2006.01)
*F21W 121/00* (2006.01)
*F21Y 105/00* (2016.01)
*F21Y 113/02* (2006.01)

(56) References Cited

U.S. PATENT DOCUMENTS 8,207,821 B2 * 6/2012 Roberge et al. ............... 340/9.11
2007/0145915 A1 * 6/2007 Roberge et al. ............... 315/312
2008/0285281 A1 * 11/2008 Chiu ............................. 362/250
2008/0310145 A1 * 12/2008 Blake et al. ................... 362/105

FOREIGN PATENT DOCUMENTS

| | | |
|---|---|---|
| DE | 1042146 B1 | 10/1958 |
| JP | 6241693 A | 9/1994 |
| JP | 0785977 A | 3/1995 |
| JP | 2006128035 A | 5/2006 |
| WO | 2008146232 A1 | 12/2008 |

* cited by examiner replacement sheet

LUMINAIRE COMBINING AMBIENT LIGHT AND TASK LIGHT

FIELD OF THE INVENTION

The invention relates to a luminaire. More specifically, the invention relates to a luminaire combining ambient light with task light.

BACKGROUND OF THE INVENTION

Luminaires that combine ambient light with task light are known in the art. Known are for example devices that combine a reading light (e.g. based on a halogen light source) that directs and focuses light substantially downwards to illuminate a book and a background light (e.g. an incandescent or halogen light source) that directs light substantially upwards to a ceiling for providing diffuse background light. Typically each light source is provided with its own light fitting wherein both light fittings may be combined into a single luminaire. In general, both light sources—i.e. the reading light and the background light—are individually controllable. For example the reading light may have an individual on/off switch and the background light may be provided with an integrated on/off dimmer switch.

In the above type of luminaires the different light sources are point sources meaning that illumination originated from a singular point. Additional reflectors and/or diffusers may be used to reshape the light beam. Nonetheless, the light distribution profile across each light beam—the reading light beam and the background light beam—is generally constant. This therefore limits the application of both light sources to "uniform illumination".

SUMMARY OF THE INVENTION

For the purpose of describing the invention, the term "task light" means light suitable for performing a task, such as studying, office work, playing cards, etc. For the purpose of describing the invention, the term "ambient light" means light suitable for creating a background illumination (e.g. indirect light though illumination of surrounding elements such as ceilings or walls) or a decorative illumination (e.g. direct light having an added value through its specific color and/or shape combination as for example known from wall mounted decorative luminaires). In general, task light and ambient light are experienced as a different quality of light.

According to one aspect of the invention, a luminaire is provided that comprises a task light module for providing task light and an ambient light module for providing ambient or decorative light, wherein the task light module comprises at least one point light source and the ambient light module comprises at least one surface light source. In a preferred embodiment the task light module comprises an LED (Light Emitting Diode light source) and the ambient light module comprises an OLED (Organic Light Emitting Diode light source).

In a further aspect of the invention, the luminaire comprises a lighting fixture comprising the task light module and the ambient light module and a base for positioning the luminaire in an environment and for supporting a lighting fixture. The base may be specifically adapted for table top mounting, floor mounting, wall mounting or ceiling mounting. The lighting fixture is preferably moveable with respect to the base. This movement may be used for redirecting the task and/or ambient light into the environment. The movement may also be used to dynamically control the ratio of amount of task light versus amount of ambient light produced by each of the light modules. For example, the luminaire's light output may be 100% ambient light versus 0% task light when the lighting fixture is in a first position (e.g. a vertical position for table top or floor mounted luminaires), and 100% task light versus 0% ambient light when the lighting fixture is in an second position (e.g. a horizontal position for table top or floor mounted luminaires). For that purpose, position and/or movement detection means may be provided to detect the position and/or displacement of the lighting fixture relative to the base and set the light output for each of the at least one task light source or at least one ambient light source based on the lighting fixture's position or displacement. Position and/or movement detection means, such as rotation sensors or MEMS based accelerometers, are well known in the art and may be integrated in the lighting fixture. A microprocessor may be integrated in the lighting fixture to control the light output of the different light sources based on the lighting fixture's position and/or displacement. An advantage of this type of light control is that it creates an intuitive direct link between a physical interaction of a user with the luminaire (e.g. putting the lighting fixture in a reading position) and the desired light output (e.g. producing task light for reading), without requiring an additional user interface such as dimmers, etc. In other words, as the user moves the lighting fixture from a vertical position to a horizontal position the light output automatically changes from ambient/decorative light to task light. The correspondence between the lighting fixture's position and type of light output (i.e. ambient light, task light or a combination thereof) and the transition curves may be preset for each type of luminaire of may be configurable or selectable by the user. The transition curves may include one or more hysteresis areas around specific lighting fixture positions, wherein the light output characteristics don't change. These hysteresis areas in fact correspond to tolerance for setting a desired lighting fixture positions or selecting a desired light output by the user. For example a hysteresis of about ±10 degrees rotation angle around the lighting fixture position for 100% task light makes it easier for the user to set this light condition and possibly to direct the light output within the limits of ±10 degrees rotation angle without effecting the amount or type of light output.

Switching the luminaire on/off may be done independent from the position or movement of the lighting fixture, e.g. by using an independent proximity sensor located in the base or on the lighting fixture for on/off tapping control of the luminaire, or may be integrated in the position or movement control of the lighting fixture in that for example a specific position, referred to as a home position, may be associated with an off state of the luminaire. In the latter case, the luminaire may switch on automatically when the lighting fixture is moved out of its home position. Also the home position may be provided with a hysteresis to create some tolerance in operating the luminaire.

The lighting fixture may have a blade shaped appearance, i.e. a structure of which the average thickness is significantly smaller than the average length and width. This blade will be further referred to as a "light blade". In a preferred embodiment the light blade is significantly longer than it is wide, i.e. the aspect ratio of the average length versus average width of the light blade is significantly higher than 1:1, preferably higher than 5:1 and more preferably higher than 10:1.

The light blade may be directly connected to the base of the luminaire by means of a hinge, allowing the light blade to rotate around a pivoting point, or may be linked indirectly to the base of the luminaire by means of an intermediate member such as a supporting arm. In the latter case, the light blade may be pivotally connected to one end of the supporting arm whereas the other end of the supporting arm may itself be pivotally or rigidly connected to the base.

The advantage of a blade shaped lighting fixture is that the lighting fixture includes at least one substantially flat surface and at least one surrounding edge into which one or more light sources may be integrated. Different design options are possible, each providing a different combination of light output. For example, a blade allows the integration of a plurality of task light sources along an edge of the blade and/or a plurality of ambient light sources integrated in a flat surface of the blade. More specifically, the ambient light may for example be created from a linear array of individual controllable square-size OLED light sources integrated in the blade surface, each OLED having substantially the size of the light blade width. The task light may for example be generated from a linear array of individually controllable LED's integrated in an edge of the blade or into the opposite blade surface of the ambient light. Also a plurality of arrays of OLED or LED light sources may be used. The array of light sources enables a whole range of different static/dynamic light effects added to task light and/or ambient light. An example of a static light effect may be a light beam producing a linear light output gradient dark-to-bright across the light blade from left to right. An example of a dynamic light effect may be a light beam producing a running light across the light blade from left to right or the simulation of a cloudy sky moving over the light blade. Dynamic lighting configurations may preferably be incorporated for the ambient light module only. A microprocessor may be use to control all of the individual light sources to produce the appropriate light effect. The microprocessor preferably is integrated in the blade shaped light fixture. There may be different ways of implementing a user interaction for selecting or activating a particular light effect. In one example, a user interface that is integral with the light blade may be used. This user interface may be based on a touch pad that is integrated with the light blade, a proximity sensor which is integrated in an edge of the blade or at an end of one of the arrays of lighting sources. Operating the touch pad or tapping the area adjacent the proximity sensor may instruct the microprocessor to switch to a different light effect or cycle through a set of preconfigured light effects. In another example, a user interaction may be set up using a wireless communication with the microprocessor for controlling the light effects produced by the light sources.

A further aspect of the invention includes the use of colored light in the ambient and/or task light. For example, the ambient light may include some additional red (to ease the mind), whereas the task light may include some additional blue (to enhance focus). OLED technology is very well suitable for producing colored light, for example be using stacked RGB OLED structures that are, next to intensity, also color controllable. In LED technology, RGB LED assemblies may be used—possibly in addition to white LEDs—to create an array of light sources. The color of the ambient light and/or the task light may be fixed or user controllable. Different way of controlling color and an associated user interface are known in the art. One example is the color ring used with the Philips LivingColors for intuitive remote control of the generated light color.

DETAILED DESCRIPTION

Figure 1A:
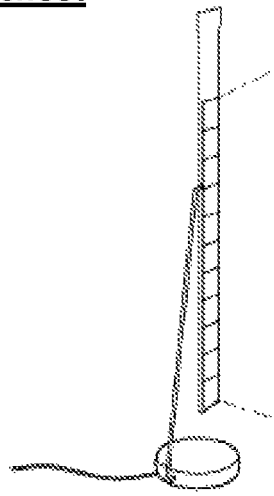
FIG. 1 shows a table top or floor mounted luminaire according to the invention.
Figure 1B:
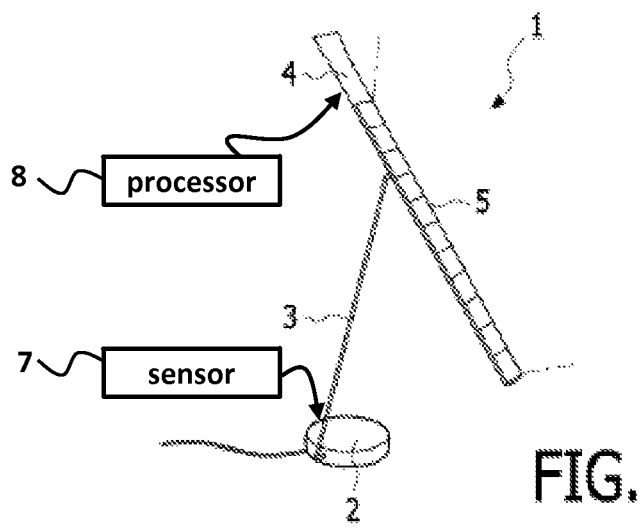
Figure 1C:
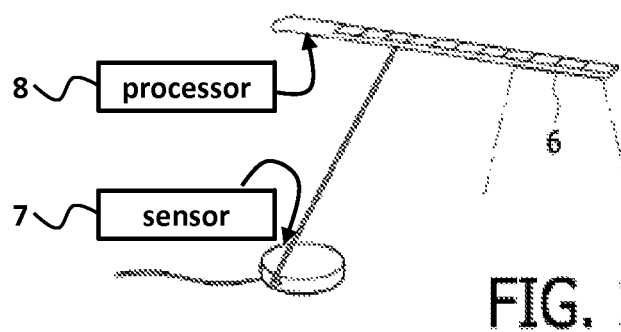

FIG. 1 discloses a table top or floor mounted luminaire 1 according to the invention. It comprises a base 2 for positioning the luminaire on the table or on the floor and a lighting fixture 4 in the form of a blade. The lighting fixture 4 is pivotally connected to supporting arm 3, which itself is pivotally connected to the base 2. As illustrated in the FIGS. 1A through 1C, the lighting fixture 4 can be rotated relative to supporting arm 3. The lighting fixture 4 comprises an array of OLED light sources 5 integrated in a surface of the blade shaped lighting fixture 4. Illustrated in FIG. 1C, the lighting fixture 4 also comprises an array of LED light sources 6 integrated in the opposite surface of the blade shaped lighting fixture 4. When the lighting fixture 4 is in a substantially vertical position (illustrated FIG. 1A), the luminaire produces an 'ambient light only' effect from its array of OLED light sources. When the lighting fixture is in a substantially horizontal position (illustrated in FIG. 1C), the luminaire produces a 'task light only' effect from its array of LED light sources. The transition from 'ambient light only' to 'task light only' may be linear with the rotation angle of the lighting fixture 4 but may also be non-linear. In one example, and only considering a rotation of the lighting fixture 4 between 0 degrees and 90 degrees, the light effect 'ambient light only' is maintained until the lighting fixture is rotated 45 degrees, after which the ambient light gradually turns into task light. The light effect 'task light only' may be reached when the rotation angle is 80 degrees and above. In some embodiments of the invention, at least one of a rotation, a translation or a position of the lighting fixture relative to the base is detected by a sensor 7 and a light output from the task light module and a light output from the ambient light module, is dynamically controlled by a processor 8 based on an output from the sensor 7.

Figure 2A:
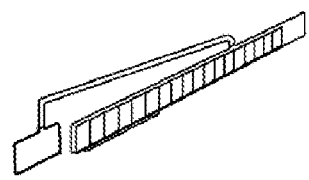
FIG. 2 shows wall mounted luminaire according to the invention.
Figure 2B:
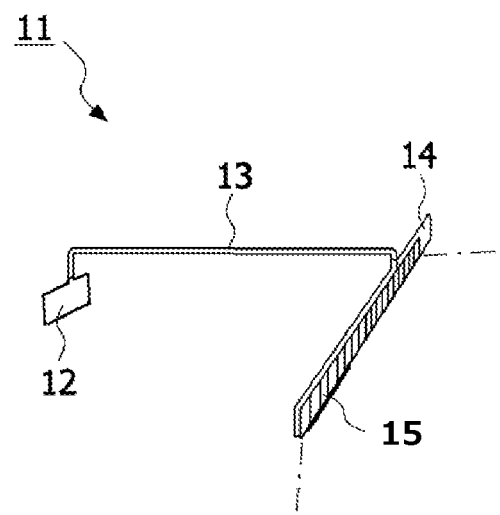
Figure 2C:
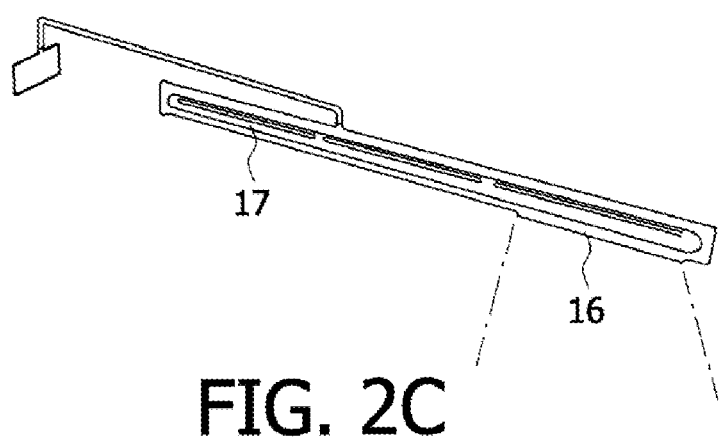

Similarly, FIG. 2 illustrates a wall mounted luminaire 11 according to the invention. It comprises a base 12 for mounting the luminaire on the wall and a lighting fixture 14 in the form of a blade. The lighting fixture 14 is pivotally connected to supporting arm 13, which itself is pivotally connected to the base 12. As illustrated in the FIGS. 2A through 2C, the lighting fixture 14 can be rotated relative to supporting arm 13 and/or relative to the base 12. The lighting fixture 14 comprises an array of OLED light sources 15 integrated in a surface of the blade shaped lighting fixture 14. Illustrated in FIG. 2C, the lighting fixture 14 also comprises an array of LED light sources 16 integrated in an edge, preferably the downward facing edge, of the blade shaped lighting fixture 14. When the lighting fixture 14 is in a substantially aligned position with the base 12 and the supporting arm 13, i.e. substantially positioned against the wall (illustrated in FIG. 1A), the luminaire produces an 'ambient light only' effect from its array of OLED light sources. When the lighting fixture is moved away from the wall (illustrated in FIG. 1C), the luminaire produces a 'task light only' effect from its array of LED light sources. The transition from 'ambient light only' to 'task light only' may be linear with the rotation angle of the lighting fixture 14 relative to the base 12—de facto relative to the wall—but may also be non-linear. In one example, a 'task light' effect may be produces when the lighting fixture 14 is moved into a position window 75 degrees to 115 degrees relative to the base 12, i.e. perpendicular to the base 12 including a tolerance window of ±15 degrees.

As illustrated in FIG. 2C, the lighting fixture 14 may have multiple arrays of light sources for producing an ambient light effect. In the embodiment depicted, the lighting fixture 14 includes an array of OLED light sources 15 (a total of 18 OLEDs is shown) integrated in a first surface of the blade shaped lighting fixture 14 and an array of side emitting light guides 17 (a total of 3 light guides is shown) integrated in the opposite surface of the blade shaped lighting fixture 14. Each light guides may for example be optically coupled with a LED light source at one of its ends. The embodiment of FIG. 2 illustrates a possible combination of decorative light, produced by the array of OLEDs facing away from the wall, and background light, produced by the array of light guides facing towards the wall. The combined decorative and background lighting effect may be active when the lighting fixture 14 is moved substantially parallel (including for example a tolerance window of ±15 degrees of rotation) to the base 12.

The invention claimed is:

1. A luminaire having a base for positioning thereof in an environment and comprising:
    a lighting fixture supported by and moveable relative to the base, the lighting fixture comprising a task light module for providing task light and an ambient light module for providing ambient or decorative light, wherein the task light module comprises at least one point light source and the ambient light module comprises at least one surface light source, wherein said at least one point light source has a substantially thinner surface area than said at least one surface light source;
    a sensor for detecting at least one of a rotation, a translation or a position of the lighting fixture relative to the base; and
    a processor for dynamically controlling a light output from the task light module and a light output from the ambient light module, based on an output from the sensor,
    wherein the lighting fixture is in the form of a blade,
    wherein the at least one surface light source of the ambient light module is integrated in a major surface of the blade, and
    wherein the at least one point light source of the task light module is integrated in a second surface of the lighting fixture that is an edge surface of the blade or is opposite of said major surface.

2. The luminaire according to claim 1, wherein the at least one point light source is an LED and the at least one surface light source is an OLED.

3. The luminaire according claim 1, wherein the task light module comprises an array of LED light sources and the ambient light module comprises an array of OLED light sources, and wherein each LED light source is individually controllable.

4. The luminaire according to claim 3, wherein each OLED light source is individually controllable.

5. The luminaire according to claim 1, wherein the lighting fixture has at least one predefined home position relative to the base for automatically switching off the luminaire.

6. The luminaire according to claim 5, wherein the luminaire is automatically switched off when in the home position and automatically switched on when out of the home position.

7. The luminaire according to claim 1, wherein the luminaire is configured such that when the lighting fixture is in a first position, the luminaire predominantly produces the ambient or decorative light, and when the lighting fixture is in a second position that is different from said first position, the luminaire predominantly produces the task light.

8. A method for illuminating an environment, comprising:
    providing a luminaire having a base for positioning the luminaire in the environment and a lighting fixture for supporting a task light module for providing task light and an ambient light module for providing ambient or decorative light, wherein the task light module comprises at least one point light source and the ambient light module comprises at least one surface light source, and wherein said at least one point light source has a substantially thinner surface area than said at least one surface light source;
    detecting at least one of a rotation, a translation or a position of the lighting fixture relative to the base, and;
    controlling a light output from the task light module and a light output from the ambient light module based on the detected rotation, movement or position of the lighting fixture relative to the base,
    wherein the lighting fixture is in the form of a blade,
    wherein the at least one surface light source of the ambient light module is integrated in a major surface of the blade, and
    wherein the at least one point light source of the task light module is integrated in a second surface of the lighting fixture that is an edge surface of the blade or is opposite of said major surface.

9. A method according to claim 8, further comprising controlling a ratio of task light output versus ambient light output, bases on the detected rotation, movement or position of the lighting fixture relative to the base.

10. A method according to claim 8, further comprising:
    comparing the detected rotation, movement or position of the lighting fixture relative to the base with a predefined position of the lighting fixture corresponding to a luminaire home position, and;
    switching the luminaire off when the lighting fixture is moved into the predefined position and switching the luminaire on when the lighting fixture is moved out of the predefined position.

11. The method of claim 8, wherein the controlling comprises predominantly producing the ambient or decorative light when the lighting fixture is in a first position, and predominantly producing the task light when the lighting fixture is in a second position that is different from said first position.

12. A luminaire having a base for positioning thereof in an environment and comprising:
    a lighting fixture supported by and moveable relative to the base, the lighting fixture comprising a task light module for providing task light and an ambient light module for providing ambient or decorative light, wherein the task light module comprises at least one point light source and the ambient light module comprises at least one surface light source;
    a sensor for detecting at least one of a rotation, a translation or a position of the lighting fixture relative to the base; and
    a processor for dynamically controlling a light output from the task light module and a light output from the ambient light module, based on an output from the sensor,
    wherein the lighting fixture is in the form of a blade, wherein the surface light source of the ambient light module is integrated in a surface of the lighting fixture, and wherein the point light source of the task light module is integrated in the opposite surface of the lighting fixture, such that when the lighting fixture is in a vertical position, the luminaire produces only the ambient or decorative light, and when the lighting fixture is in a horizontal position, the luminaire produces only the task light.

* * * * *